(12) United States Patent
Huang et al.

(10) Patent No.: US 9,913,172 B2
(45) Date of Patent: Mar. 6, 2018

(54) METHOD FOR ENABLING COEXISTENCE OF MULTIPLE WIRELESS COMMUNICATION MODES IN MOBILE TERMINAL AND MOBILE TERMINAL THEREOF

(71) Applicant: Spreadtrum Communications (Shanghai) Co., Ltd., Zhangjiang, Shanghai (CN)

(72) Inventors: Wentao Huang, Shanghai (CN); Shanyi Xie, Shanghai (CN); Guotao Zhao, Shanghai (CN)

(73) Assignee: SPREADTRUM COMMUNICATIONS (SHANGHAI) CO., LTD., Zhangjiang, Shanghai (CN)

( * ) Notice: Subject to any disclaimer, the term of this patent is extended or adjusted under 35 U.S.C. 154(b) by 369 days.

(21) Appl. No.: 14/705,286

(22) Filed: May 6, 2015

(65) Prior Publication Data
US 2016/0066262 A1 Mar. 3, 2016

(30) Foreign Application Priority Data
Aug. 29, 2014 (CN) .......................... 2014 1 0438596

(51) Int. Cl.
H04W 48/18 (2009.01)
H04W 36/00 (2009.01)
H04L 1/00 (2006.01)
H04W 88/06 (2009.01)
H04W 72/00 (2009.01)

(52) U.S. Cl.
CPC ............... *H04W 36/00* (2013.01); *H04L 1/00* (2013.01); *H04W 72/00* (2013.01); *H04W 88/06* (2013.01)

(58) Field of Classification Search
CPC ..... H04W 36/00; H04W 88/06; H04W 72/00; H04L 1/00
See application file for complete search history.

(56) References Cited

U.S. PATENT DOCUMENTS

2008/0268843 A1* 10/2008 Ore .................. H04W 36/0061
455/435.3
2009/0219904 A1* 9/2009 Khairmode ........... H04W 88/06
370/338

\* cited by examiner

*Primary Examiner* — Gbemileke J Onamuti
(74) *Attorney, Agent, or Firm* — Cantor Colburn LLP

(57) ABSTRACT

A method for enabling coexistence of multiple communication modes in mobile terminal and a mobile terminal thereof are provided. The method includes: when the mobile terminal is currently working in a first communication mode, if the mobile terminal receives a first signal of a second communication mode in a first frequency band, determining whether to continue working in the first communication mode or to shift to work in first frequency band of the second communication mode based on a preset priority rank. Accordingly, interferences between multiple wireless communication modes in a mobile terminal can be reduced.

18 Claims, 3 Drawing Sheets

METHOD FOR ENABLING COEXISTENCE OF MULTIPLE WIRELESS COMMUNICATION MODES IN MOBILE TERMINAL AND MOBILE TERMINAL THEREOF

CROSS-REFERENCE TO RELATED APPLICATIONS

The present invention claims priority under 35 U.S.C. § 119 to Chinese patent application No. 201410438596.3, filed on Aug. 29, 2014, the entire content of which is incorporated herein by reference.

TECHNICAL FIELD

The present disclosure generally relates to communication technology, and more particularly, to a method for enabling coexistence of multiple wireless communication modes in mobile terminal and a mobile terminal thereof.

BACKGROUND

LTE (Long Term Evolution) is a standard for wireless communications. Data transmission capability and speed are improved under LTE, due to the usage of new technologies and modulation methods. As such, LTE is taken as the mainstream interim technology supported by many carries all over the world.

However, it is still very common that both the LTE and the 2G/3G technologies, such as GSM (Global System for Mobile Communication) and TD-SCDMA (Time Division-Synchronous Code Division Multiple Access), are existed in one mobile terminal at the same time. Furthermore, in some countries, such as China, given advantages on speed and cost, the WLAN (Wireless Local Area Networks) technology has been widely used and become an indispensable part of mobile terminal devices.

Accordingly, the mobile terminal device has to be able to support multiple wireless communication technologies. For example, one mobile terminal device has to support the 2G/3G technology and the WLAN technology at the same time. Or, one mobile terminal device has to support the LTE technology and the WLAN technology at the same time. In the wireless spectrum, 2G/3G, WLAN and LTE have frequency bands close to or even neighboring to each other. Therefore, interferences among these wireless communications are unavoidable, which may cause performance degradation of the mobile terminal device.

In existing mobile terminal devices, filters are often used to reduce interferences among different wireless communication modes and prevent such interferences from degrading performance of other wireless communication modes. However, this kind of method is costly and usually not sufficient to repress interferences between adjacent frequency bands.

SUMMARY

According to one embodiment of the present disclosure, a method for enabling coexistence of multiple wireless communication modes in a mobile terminal is provided. The method includes: when the mobile terminal is currently working in a first communication mode, if the mobile terminal receives a first signal of a second communication mode in a first frequency band, determining whether to continue working in the first communication mode or to shift to work in the first frequency band of the second communication mode based on a preset priority rank.

In some embodiments, the first communication mode is a WLAN communication mode.

In some embodiments, determining whether to continue working in the first communication mode or to shift to work in the first frequency band of the second communication mode based on the preset priority rank includes: generating one or more enable signals after the first signal is received, wherein each of the one or more enable signals indicates status of one communication mode in one frequency band, and one of the one or more enable signals indicates that status of the second communication mode in the first frequency band is valid; implementing a logical calculus based on the one or more enable signals and one or more preset control signals corresponding to the one or more enable signals, wherein the one or more preset control signals respectively indicate preset priority ranks between the first communication mode and one or more communication modes in one or more frequency bands corresponding to the one or more enable signals; and determining whether to continue working in the first communication mode or to shift to work in the first frequency band of the second communication mode based on an ultimate result of the logical calculus.

In some embodiments, the one or more communication modes include a LTE communication mode and a 2G/3G communication mode, the one or more enable signals include enable signals for indicating status of the LTE communication mode in multiple frequency bands and the 2G/3G communication mode in at least one frequency band, and correspondingly the one or more control signals include control signals for indicating preset priority ranks between the LTE communication mode in the multiple frequency bands and the first communication mode, and between the 2G/3G communication mode in the at least one frequency band and the first communication mode.

In some embodiments, the one or more communication modes include a LTE communication mode, the one or more enable signals include enable signals for indicating status of the LTE communication mode in multiple frequency bands, and correspondingly the one or more control signals include control signals for indicating preset priority ranks between the LTE communication mode in the multiple frequency bands and the first communication mode.

In some embodiments, the one or more communication modes include a 2G/3G communication mode, the one or more enable signals include enable signals for indicating status of the 2G/3G communication mode in the at least one frequency band, and correspondingly the one or more control signals include control signals for indicating preset priority rank between the 2G/3G communication mode in the at least one frequency band and the first communication mode.

In some embodiments, implementing the logical calculus includes implementing a logical AND operation to the one or more enable signals and the corresponding one or more control signals, respectively.

In some embodiments, when there are two or more enable signals, implementing the logical calculus includes: implementing a logical AND operation to the two or more enable signals and the corresponding two or more control signals respectively, to obtain two or more first results; and implementing a logical OR operation to the two or more first results to obtain the result of the logical calculus.

In some embodiments, the multiple frequency bands of the LTE communication mode include frequency band 38, frequency band 39, frequency band 40, and frequency band 41.

In some embodiments, the at least one frequency band of the 2G/3G communication mode includes DCS frequency band of a GSM communication mode, or frequency bands 34 and 39 of a TD-SCDMA communication mode.

According to one embodiment of the present disclosure, a mobile terminal is provided. The mobile terminal includes: a receiving unit adapted to receive signals; and a determining unit adapted to: when the mobile terminal is currently working in a first communication mode, if the receiving unit receives a first signal of a second communication mode in a first frequency band, determine whether to continue working in the first communication mode or to shift to work in the first frequency band of the second communication mode based on a preset priority rank.

In some embodiments, the first communication mode is a WLAN communication mode.

In some embodiments, the mobile terminal further includes: an enable signal generating unit adapted to generate one or more enable signals after the first signal is received, wherein each of the one or more enable signals indicates status of one communication mode in one frequency band, and one of the one or more enable signals indicates that status of the second communication mode in the first frequency band is valid; a control signal generating unit adapted to generate one or more control signals corresponding to the one or more enable signals, wherein the one or more control signals respectively indicate preset priority ranks between the first communication mode and one or more communication modes in one or more frequency bands corresponding to the one or more enable signals; and a logical calculating unit adapted to implement a logical calculus based on the one or more enable signals and the one or more control signals, to obtain an ultimate result based on which the determining unit is adapted to determine whether to continue working in the first communication mode or to shift to work in the first frequency band of the second communication mode.

In some embodiments, the one or more communication modes include a LTE communication mode and a 2G/3G communication mode, the one or more enable signals include enable signals for indicating status of the LTE communication mode in multiple frequency bands and the 2G/3G communication mode in at least one frequency band, and correspondingly the one or more control signals include control signals for indicating preset priority ranks between the LTE communication mode in the multiple frequency bands and the first communication mode, and between the 2G/3G communication mode in the at least one frequency band and the first communication mode.

In some embodiments, the one or more communication modes include a LTE communication mode, the one or more enable signals include enable signals for indicating status of the LTE communication mode in multiple frequency bands, and correspondingly the one or more control signals include control signals for indicating preset priority ranks between the LTE communication mode in the multiple frequency bands and the first communication mode.

In some embodiments, the one or more communication modes include a 2G/3G communication mode, the one or more enable signals include enable signals for indicating status of the 2G/3G communication mode in the at least one frequency band, and correspondingly the one or more control signals include control signals for indicating preset priority rank between the 2G/3G communication mode in the at least one frequency band and the first communication mode.

In some embodiments, the logical calculating unit is adapted to implement a logical AND operation to the one or more enable signals and the corresponding one or more control signals, respectively.

In some embodiments, when there are two or more enable signals, the logical calculating unit is adapted to: implement a logical AND operation to the two or more enable signals and the corresponding two or more control signals respectively, to obtain two or more first results; and implementing a logical OR operation to the two or more first results to obtain the ultimate result of the logical calculus.

In some embodiments, the multiple frequency bands of the LTE communication mode include frequency band 38, frequency band 39, frequency band 40, and frequency band 41.

In some embodiments, the at least one frequency band of the 2G/3G communication mode includes DCS frequency band of a GSM communication mode, or frequency bands 34 and 39 of a TD-SCDMA communication mode.

Accordingly, in the method provided by the present disclosure, a priority rank is preset to determine the working mode of the mobile terminal. Specifically, when multiple communication modes required to be processed by the mobile terminal, the communication mode having a higher priority will be processed firstly. Therefore, coexistence of multiple communication modes can be achieved without interfering each other.

Furthermore, the priority rank is indicated by at least one control signal via voltage level. When a signal within a first frequency band of a second communication mode is received, at least one enable signal is generated. Through implementing logical calculus to the enable signal and the corresponding control signal, an ultimate result can be obtained. Thus, based on the ultimate result of the logical calculus, the working mode of the mobile terminal can be determined.

Furthermore, the first communication mode is WLAN communication mode, the at least one communication mode includes LTE communication mode, GSM communication mode or TD-SCDMA communication mode. The first frequency band of the second communication mode is one of the frequency band 38 of LTE communication mode, frequency band 39 of LTE communication mode, frequency band 40 of LTE communication mode, frequency band 41 of LTE communication mode, DCS frequency band of GSM communication mode, frequency band 34 of TD-SCDMA communication mode, and frequency band 39 of TD-SCDMA communication mode, all of which have frequency ranges close to that of the WLAN communication mode. Through implementing logical calculus to enable signals and control signals corresponding to the frequency bands of the LTE communication mode, the frequency ban of the GSM communication mode and frequency bands of the TD-SCDMA communication mode, the working mode of the mobile terminal can be determined. In other words, it can be determined whether the mobile terminal keep operating in the first communication mode or switch to operate in the first frequency band of the second communication mode.

DETAILED DESCRIPTION

Figure 1:
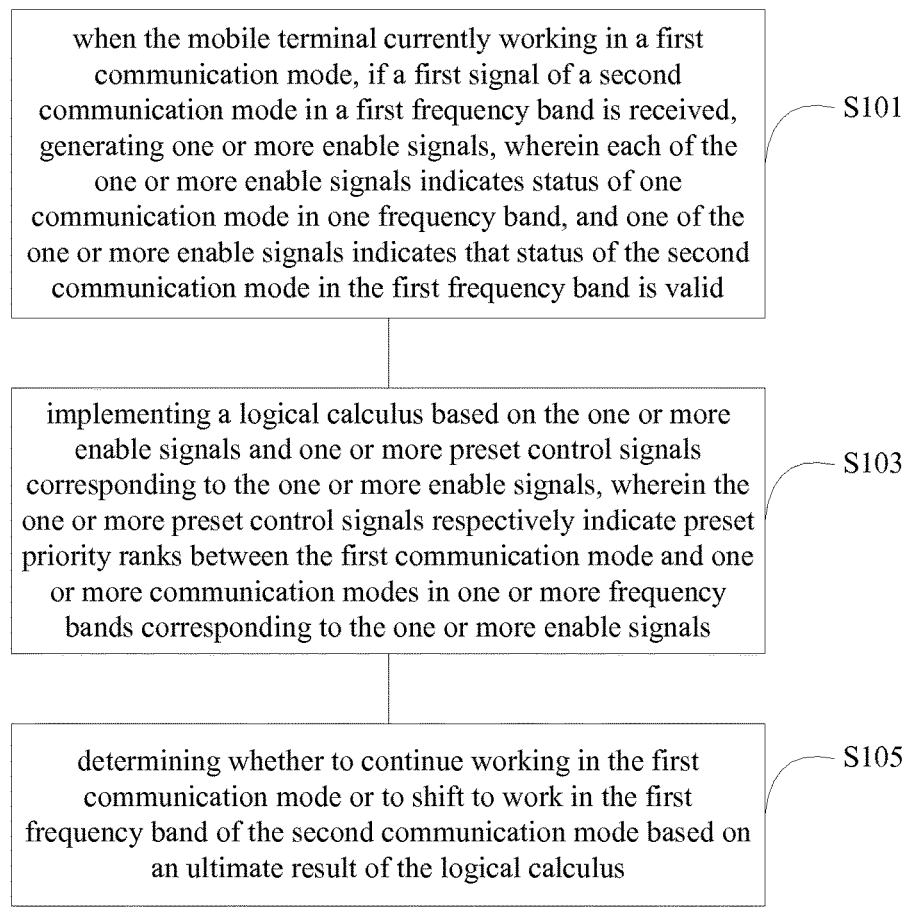
FIG. 1 schematically illustrates a flow chart of a method for enabling coexistence of multiple wireless communications in a mobile terminal according to one embodiment of the present disclosure.

In order to clarify the objects, characteristics and advantages of the present disclosure, embodiments of the present disclosure will be described in detail in conjunction with the accompanying drawings. The disclosure will be described with reference to certain embodiments. Accordingly, the present disclosure is not limited to the embodiments disclosed. It will be understood by those skilled in the art that various changes may be made without departing from the spirit or scope of the disclosure.

As recited in the background, usually a mobile terminal can support multiple wireless communication modes, thus interferences adjacent frequency bands of different wireless communication modes tend to occur. In existing mobile terminals, filters are used to reduce these interferences, which is costly and has bad performance on repressing interferences between neighboring frequency bands. In the present disclosure, a method for enabling coexistence of multiple wireless communication modes in a mobile terminal is provided, wherein the multiple wireless communication modes are configured to operate coordinately, so as to avoid interferences therebetween.

In the present disclosure, coexistence of WLAN communication mode and LTE communication mode, and coexistence of WLAN communication mode and 2G/3G communication mode are mainly taken into consideration. In order to avoid the mobile terminal operating in both the WLAN communication mode and LTE communication mode, or avoid the mobile terminal operating in both the WLAN communication mode and 2G/3G communication mode, operating times of the multiple communication modes are staggered. Specifically, a priority rank of the multiple communication modes is preset, thus when two or more communication modes required to be operated at the same time, one of the multiple communication modes will enjoy the priority and be operated firstly, while other multiple communication modes will be processed thereafter.

The WLAN communication mode based on IEEE802.11 standard uses RF signals having a frequency of 2.4 GHz or 5 GHz within the ISM frequency band to implement wireless connections. Currently, in some countries, such as China, frequency bands 38, 39, 40 and 41 used by the LTE communication mode, frequency band DCS (Digital Cellular System) 1800 used by the GSM communication mode, and frequency bands 34 and 39 used by the TD-SCDMA communication mode have frequency ranges close to the frequency 2.4 GHz used by the WLAN communication mode. Therefore, in the present disclosure, these frequency bands recited above are mainly taken into consideration, so as to avoid interferences therebetween. Specifically, when both two communication modes need to use the mobile terminal at the same time, a priority will be given to one of the communication modes by a specific circuit, thus the communication enjoying the priority will be processed firstly. Therefore, multiple communication modes can work in a common mobile terminal coordinately without interfering each other.

Referring to FIG. 1, a flow chart of a method for enabling coexistence of multiple wireless communication modes in a mobile terminal according to one embodiment of the present disclosure is illustrated. The method includes three steps, namely, step S101, step S103 and step S105. It should be noted that, the mobile terminal initially operates in a first communication mode.

In S101, when the mobile terminal currently working in a first communication mode, if a first signal of a second communication mode in a first frequency band is received, generating one or more enable signals, wherein each of the one or more enable signals indicates status of one communication mode in one frequency band, and one of the one or more enable signals indicates that status of the second communication mode in the first frequency band is valid. As the signal received is within the first frequency band of the second communication mode, the status of the first frequency band of the second communication mode is indicated by corresponding enable signal as valid, other first frequency bands (if any) are indicated as invalid by corresponding enable signals, respectively.

In S103, implementing a logical calculus based on the one or more enable signals and one or more preset control signals corresponding to the one or more enable signals, wherein the one or more preset control signals respectively indicate preset priority ranks between the first communication mode and one or more communication modes in one or more frequency bands corresponding to the one or more enable signals.

In S105, determining whether to continue working in the first communication mode or to shift to work in the first frequency band of the second communication mode based on an ultimate result of the logical calculus.

Figure 2:
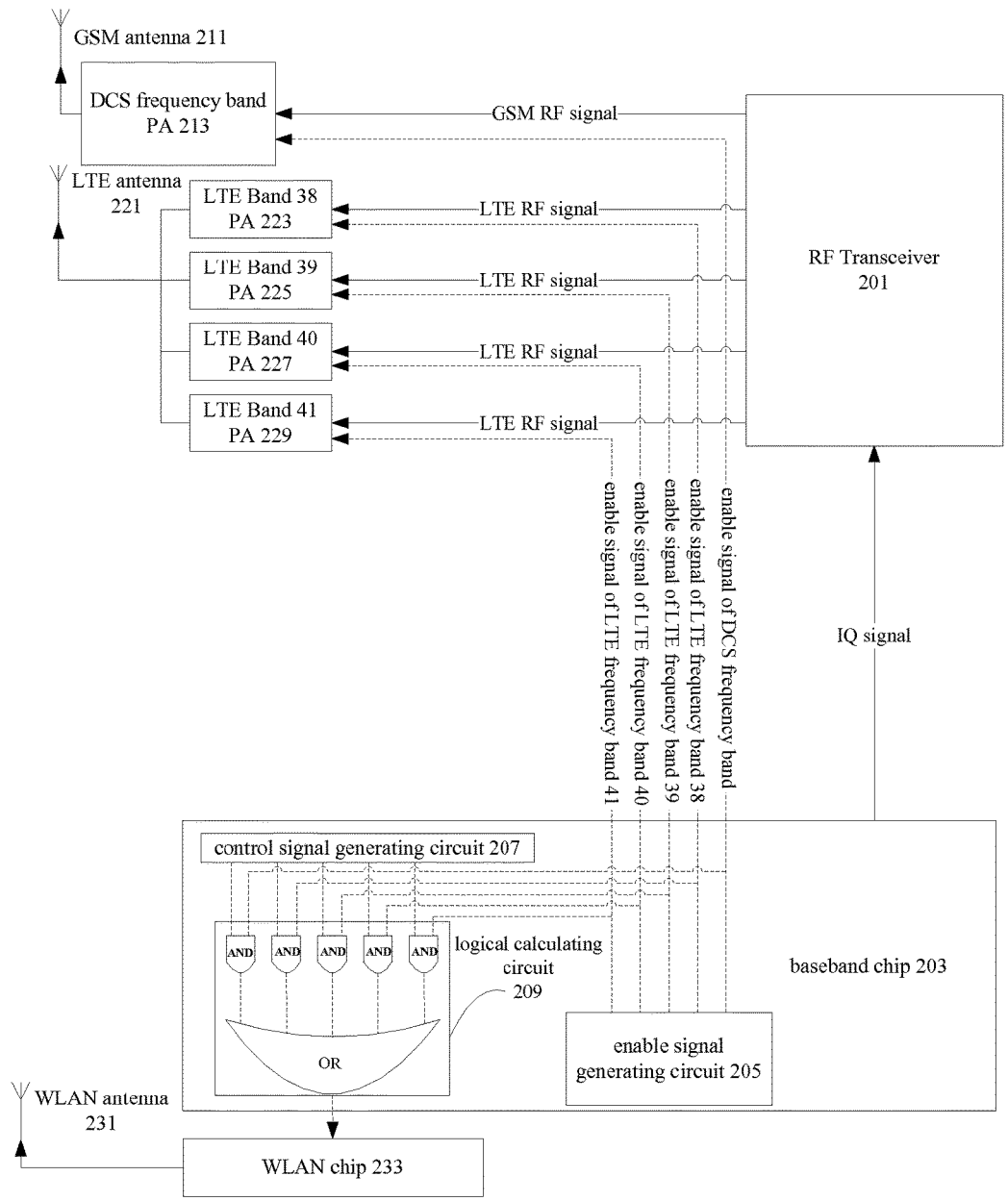
FIG. 2 schematically illustrates a internal circuit architecture of a mobile terminal according to one embodiment of the present disclosure.

Referring to FIG. 2, an internal circuit of the mobile terminal according to one embodiment of the present disclosure is illustrated. The method recited above is illustrated in combination with FIG. 2 as following.

In some embodiments, the one or more communication modes include LTE communication mode and GSM communication mode, and the first communication mode is WLAN communication mode. Accordingly, the method illustrated relating to FIG. 1 is used for coordinating these three wireless communication modes, thus they can coexist in the mobile terminal without interfering each other.

In some embodiments, the one or more communication modes include at least one selected from a group consisting of LTE communication mode, GSM communication mode, and TD-SCDMA communication mode.

As shown in FIG. 2, the internal circuit of the mobile terminal includes: a RF (Radio Frequency) transceiver 201, a baseband chip 203, an enable signal generating circuit 205, a control signal generating circuit 207, a logical calculating circuit 209, a GSM antenna 211, a LTE antenna 221, a power amplifier (PA) for DCS frequency band, a power amplifier for frequency band 38, a power amplifier for frequency band 39, a power amplifier for frequency band 40, a power amplifier for frequency band 41, a WLAN antenna 231, and a WLAN chip 233.

The GSM antenna 211, the LTE antenna 221, and the WLAN antenna 231 are adapted to send and receive GSM signals, LTE signals and WLAN signals, respectively. The baseband chip 203 is adapted to implement a baseband processing, such as coding, modulating, demodulating, decoding and the like, to signals. The enable signal generating circuit 205 is adapted to generate one or more enable signals. The control signal generating circuit 207 is adapted to generate the one or more control signals which indicate priority ranks between the one or more frequency band of the one or more communication mode (e.g. the LTE communication mode or the GSM communication mode) and the first communication mode (e.g. the WLAN communication mode). The logical calculating circuit 209 is adapted to implement a logical calculus to the enable signals and the corresponding control signals. The RF transceiver 201 is adapted to process signals output from the baseband chip 203, so as to generate corresponding RF signals; and send the RF signals generated to corresponding power amplifier. The power amplifiers are adapted to amplify signals in corresponding frequency bands, thus the amplified signals are able to be sent via the antennas. For example, the power amplifier for frequency band 38 is adapted to amplify signals within the frequency band 38. The WLAN chip 233 is adapted to process signals received by the WLAN antenna 231, and generate, based on the signals received, new signals which can be sent via the WLAN antenna 231.

In some embodiments, only frequency bands of the LTE communication mode neighboring to that of the WLAN communication mode, and frequency bands of the GSM communication mode neighboring to that of the WLAN communication mode are taken into consideration, so as to avoid interferences between the LTE signals and the WLAN signals, and interferences between the GSM signals and the WLAN signals. For example, in the LTE communication mode in China, frequency band 38, frequency band 39, frequency band 40, and frequency band 41 have frequencies ranging from 2570 MHz to 2620 MHz, from 1880 MHz to 1920 MHz, from 2300 MHz to 2400 MHz, and from 2496 MHz to 2690 MHz, respectively. In the GSM communication mode in China, frequency band DCS1800 has a frequency ranging from 1710 MHz to 1880 MHz. These five frequency bands recited above are neighboring to the frequency band 2.4 GHz of the WLAN communication mode. In other words, interferences between these five frequency bands and the frequency band 2.4 GHz tend to occur. Accordingly, when a signal within any one of the frequency bands of the LTE communication mode or within the frequency band of the GSM communication mode is received by the mobile terminal, priority rank between the WLAN communication mode and the LTE communication mode, or priority rank between the WLAN communication mode and the GSM communication mode can be obtained by method provided by the present disclosure. Therefore, signals of one communication mode will enjoy the priority and be processed in advance of any other communication mode. As such, interferences between different communication modes can be avoided.

In some embodiments, frequency band 34 and frequency band 39 of the TD-SCDMA communication mode (have frequencies ranging from 2010 MHz to 2025 MHz, and from 1880 MHz to 1920 MHz, respectively) may be taken into consideration as well, as they have frequencies neighboring to that of the WLAN communication mode and interferences tend to occur.

In some embodiments, the step S101 is implemented firstly, that is, when a first signal of a second communication mode in a first frequency band is received, generating one or more enable signals, wherein each of the one or more enable signals indicates status of one communication mode in one frequency band, and one of the one or more enable signals indicates that status of the second communication mode in the first frequency band is valid.

As shown in FIG. 2, in some embodiments, the one or more enable signal includes five enable signals for respectively indicating statuses of frequency band DCS, frequency band 38, frequency band 39, frequency band 40, and frequency band 41. Supposing a signal of the LTE communication mode in the frequency band 39 is received, when the mobile terminal is currently working in the WLAN communication mode, which means the LTE communication mode is the second communication mode, and the frequency band 39 is the first frequency band. In this case, status of the frequency band 39 is indicated as valid by corresponding enable signal and statuses of frequency band DCS, frequency band 38, frequency band 40, and frequency band 41 are respectively indicated as invalid by corresponding enable signals. In some embodiments, statuses of the frequency bands are represented by voltage levels of the enable signals. For example, valid frequency band is represented by high voltage level, and invalid frequency band is represented by low voltage level. In other words, when an enable signal is in high voltage level, it means the status of the corresponding frequency band is valid. In some embodiments, invalid frequency band is represented by high voltage level, and valid frequency band is represented by low voltage level.

Thereafter, the step S103 is implemented, that is, implementing a logical calculus based on the one or more enable signals and one or more control signals corresponding to the one or more enable signals, wherein the one or more preset control signals respectively indicate preset priority ranks between the first communication mode and the one or more communication modes in the one or more frequency bands corresponding to the one or more enable signals.

In some embodiments, the first communication mode is the WLAN communication mode. Before the first signal of the second communication mode in the first frequency band is received, the mobile terminal is working in the WLAN communication mode. In other words, the mobile terminal is used to receive and sent signals of the WLAN communication mode.

In some embodiments, the control signal is preset in advance according to specific rules. For example, the GSM communication mode and the LTE communication mode are set having higher priority than the WLAN communication mode. In other words, if LTE service or GSM service bursts when the mobile terminal is working in the WLAN communication mode, the WLAN communication mode will be paused, and the LTE service or the GSM service will be processed firstly. In this case, the control signals corresponding to the five frequency bands recited above are all in high voltage level, which means all these five frequency bands enjoy higher priority than the WLAN communication mode. In some embodiments, the control signal corresponding to a frequency band that enjoys higher priority than the WLAN communication mode is in low voltage level.

In some embodiments, the DCS frequency band of the GSM communication mode, and the frequency bands 38 and 39 of the LTE communication mode are set having higher priority than the WLAN communication mode, the frequency bands 40 and 41 of the LTE communication mode are set having lower priority than the WLAN communication mode. Thus, the control signals corresponding to the DCS frequency band and the frequency bands 38 and 39 are in high voltage level, and the control signals corresponding to the frequency bands 40 and 41 are in low voltage level.

Hereafter, the DCS frequency band of the GSM communication mode, and the frequency bands 38, 39, 40, and 41 of the LTE communication mode are all taken as having higher priority than the WLAN communication mode, for exemplarily illustrating the present disclosure.

In some embodiments, implementing a logical calculus based on the enable signal and the control signal includes: when there is only one enable signal and correspondingly one control signal, implementing a logical AND operation to the enable signal and the control signal to obtain a first result, wherein the first result is taken as the ultimate result of the logical calculus; when there are two or more enable signals and correspondingly two or more control signals, implementing a logical AND operation to the two or more enable signals and the two or more control signals respectively, to obtain two or more first results, and implementing a logical OR operation to the two or more first results to obtain a second result, wherein the second result is taken as the ultimate result of the logical calculus.

In some embodiments, there are five enable signals, wherein the enable signal of the frequency band 39 of the LTE communication mode is in high voltage level, and enable signals of other frequency bands are in low voltage level. Five control signals corresponding to the five enable signals are all in high level. Thus, the first results of the DCS frequency band of the GSM communication mode, the frequency band 38 of the LTE communication mode, the frequency band 39 of the LTE communication mode, the frequency band 40 of the LTE communication mode, and the frequency band 41 of the LTE communication mode are respectively 0, 0, 1, 0, and 0. Therefore, the second result is 1, and thus the ultimate result of the logical calculus is also 1.

It should be noted that the logical calculus is not limited to the logical AND operation and the logical OR operation. In some embodiments, the logical calculus may include other logical operations, as long as the ultimate result is able to be used to determine the priority rank between the first frequency band of the second communication mode and the first communication mode. In other words, the ultimate result of the logical calculus is able to be used to determine whether to continue working in the first communication mode or to shift to work in the first frequency band of the second communication mode.

Thereafter, the step S105 is implemented, that is, determining whether to continue working in the first communication mode or to shift to work in the first frequency band of the second communication mode based on the ultimate result of the logical calculus.

In some embodiments, both the control signal corresponding to frequency band with higher priority and the enable signal corresponding to valid frequency band are represented by high voltage level. In this case, if the ultimate result of the logical calculus is 1, the mobile terminal will shift to work in the first frequency band of the second communication mode.

For example, as the ultimate result of the logical calculus is 1, the WLAN communication mode is paused, and the mobile terminal is shift to work in the frequency band 39 of the LTE communication mode.

Accordingly, when the LTE communication mode or the GSM communication mode bursts during the mobile terminal is working in the WLAN communication mode, the WLAN communication mode is paused and the mobile terminal is shift to work in the LTE communication mode or the GSM communication mode. As such, interferences between the WLAN communication and other communication modes (e.g. the LTE communication mode and the GSM communication mode) can be avoided.

In some embodiments, the ultimate result of the logical calculus is 0, thus the mobile terminal will keep working in the WLAN communication mode.

In some embodiments, the mobile terminal may keep working in the WLAN communication mode when the ultimate result of the logical calculus is 1, and switch to operate in the first frequency band of the second communication mode when the ultimate result of the logical calculus is 0, which depends on meanings of the voltage levels of the control signals and the enable signals.

In some embodiments, the method may further include: when the first frequency band of the second communication mode is determined enjoying the higher priority, the first frequency band of the second communication mode is operated in advance, after which the first communication mode will be operated; when the first communication mode is determined enjoying the higher priority, the first communication mode is operated in advance, after which the first frequency band of the second communication mode will be operated.

For example, when the frequency band 39 of the LTE communication mode is finished, the enable signal of the frequency band 39 will change to be in low voltage level. Thus, the ultimate result of the logical calculus is 0, and the mobile terminal will operate in the WLAN communication mode again.

In some embodiments, through presetting suitable control signals, interferences between the WLAN communication mode and other communication modes, or interferences between the WLAN communication mode and specific frequency bands of other communication modes can be avoided. Therefore, coexistence of multiple communication modes can be achieved.

It should be noted that, the working mode of the mobile terminal may be determined through other ways besides the logical calculus recited above.

Figure 3:
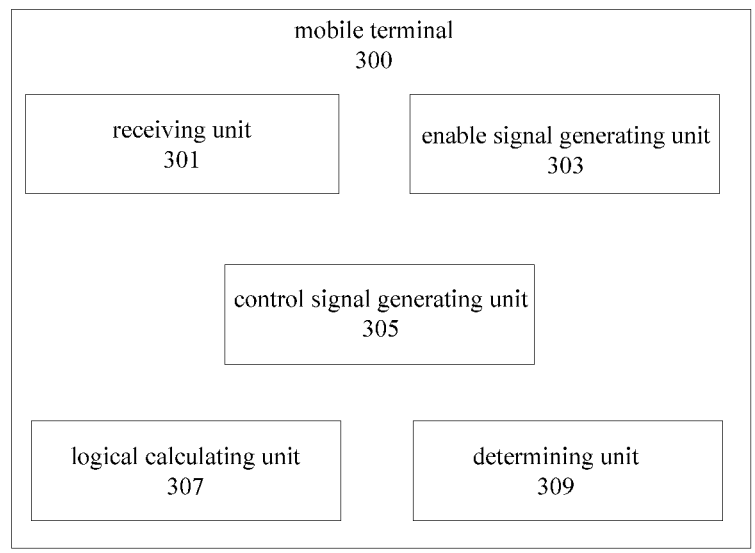
FIG. 3 schematically illustrates a block diagram of a mobile terminal according to one embodiment of the present disclosure.

Referring to FIG. 3, a mobile terminal according to one embodiment of the present disclosure is illustrated. The mobile terminal includes: a receiving unit 301, an enable signal generating unit 303, a control signal generating unit 305, a logical calculating unit 307, and a determining unit 309.

The receiving unit 301 is adapted to receive signals.

The enable signal generating unit 303 is adapted to: when a first signal of a second communication mode in a first frequency band is received by the receiving unit 301, generate one or more enable signals, wherein each of the one or more enable signals indicates status of one communication mode in one frequency band, and one of the one or more enable signals indicates that status of the second communication mode in the first frequency band is valid.

The control signal generating unit 305 is adapted to generate one or more preset control signals corresponding to the one or more enable signals, wherein the one or more preset control signals respectively indicate preset priority ranks between the first communication mode and the communication modes in the frequency bands corresponding to the one or more enable signals.

The logical calculating unit 307 is adapted to implement a logical calculus based on the one or more enable signals and the one or more preset control signals, to obtain an ultimate result.

The determining unit 309 is adapted to determine whether to continue working in the first communication mode or to shift to work in the first frequency band of the second communication mode based on the ultimate result of the logical calculus.

In some embodiments, the logical calculating unit 307 is adapted to implement a logical AND operation to the control signals and the corresponding enable signals, respectively.

In some embodiments, when there is two or more enable signals and correspondingly two or more control signals, the logical calculating unit 307 is adapted to: implement the logical AND operation to the two or more enable signals and the corresponding two or more control signals respectively, to obtain two or more first results; and implement a logical OR operation to the two or more first results to obtain a second result, wherein the second result is taken as an ultimate result of the logical calculus.

In some embodiments, the first communication mode is the WLAN communication mode.

In some embodiments, the one or more communication modes include the LTE communication mode and the 2G/3G communication mode. There are two or more enable signals and correspondingly two or more control signals, wherein the two or more enable signals are used to indicate statuses of two or more frequency bands of the LTE communication mode and at least one frequency band of the 2G/3G communication mode, the two or more control signals are used to indicate priority ranks between the two or more frequency bands of the LTE communication mode and the first communication mode, and between the at least one frequency band of the 2G/3G communication mode and the first communication mode.

In some embodiments, the at least one communication mode is the LTE communication mode. There are two or more enable signals and correspondingly two or more control signals, wherein the two or more enable signals are used to indicate statuses of two or more frequency bands of the LTE communication mode, and the two or more control signals are used to indicate priority ranks between the two or more frequency bands of the LTE communication mode and the first communication mode.

In some embodiments, the at least one communication mode is the 2G/3G communication mode. There are at least one enable signal and correspondingly at least one control signal, wherein the at least one enable signal is used to indicate status of the at least one frequency band of the 2G/3G communication mode, and the at least one control signal is used to indicate priority rank between the at least one frequency band of the 2G/3G communication mode and the first communication mode.

Although the present disclosure has been disclosed above with reference to preferred embodiments thereof, it should be understood by those skilled in the art that various changes may be made without departing from the spirit or scope of the disclosure. Accordingly, the present disclosure is not limited to the embodiments disclosed.

What is claimed is:

1. A method for enabling coexistence of multiple wireless communication modes in a mobile terminal, comprising:
when the mobile terminal is currently working in a first communications mode, if the mobile terminal receives a first signal of a second communication mode in a first frequency band, determining whether to continue working in the first communication mode or to shift to work in the first frequency band of the second communication mode based on a preset priority rank, wherein determining whether to continue working in the first communication mode or to shift to work in the first frequency band of the second communication mode based on the preset priority rank comprises:
generating one or more enable signals after the first signal is received, wherein each of the one or more enable signals indicates status of one communication mode in one frequency band, and one of the one or more enable signals indicates that status of the second communication mode in the first frequency band is valid;
implementing a logical calculus based on the one or more enable signals and one or more preset control signals corresponding to the one or more enable signals, wherein the one or more preset control signals respectively indicate preset priority ranks between the first communication mode and one or more communication modes in one or more frequency bands corresponding to the one or more enable signals; and
determining whether to continue working in the first communication mode or to shift to work in the first frequency band of the second communication mode based on an ultimate result of the logical calculus.

2. The method according to claim 1, wherein the first communication mode is a Wireless Local Area Network (WLAN) communication mode.

3. The method according to claim 1, wherein the one or more communication modes comprise a Long Term Evolution (LTE) communication mode and a 2G/3G communication mode, the one or more enable signals comprise enable signals for indicating status of the LTE communication mode in multiple frequency bands and the 2G/3G communication mode in at least one frequency band, and correspondingly the one or more control signals comprise control signals for indicating preset priority ranks between the LTE communication mode in the multiple frequency bands and the first communication mode, and between the 2G/3G communication mode in the at least one frequency band and the first communication mode.

4. The method according to claim 3, wherein the multiple frequency bands of the LTE communication mode comprise frequency band 38, frequency band 39, frequency band 40, and frequency band 41.

5. The method according to claim 3, wherein the at least one frequency band of the 2G/3G communication mode comprises Digital Cellular System (DCS) frequency band of a Global System for Mobile Communication (GSM) communication mode, or frequency bands 34 and 39 of a Time Division-Synchronous Code Division Multiple Access (TD-SCDMA) communication mode.

6. The method according to claim 1, wherein the one or more communication modes comprise a LTE communication mode, the one or more enable signals comprise enable signals for indicating status of the LTE communication mode in multiple frequency bands, and correspondingly the one or more control signals comprise control signals for indicating preset priority ranks between the LTE communication mode in the multiple frequency bands and the first communication mode.

7. The method according to claim 1, wherein the one or more communication modes comprise a 2G/3G communication mode, the one or more enable signals comprise enable signals for indicating status of the 2G/3G communication mode in the at least one frequency band, and correspondingly the one or more control signals comprise control signals for indicating preset priority rank between the 2G/3G communication mode in the at least one frequency band and the first communication mode.

8. The method according to claim 1, wherein implementing the logical calculus comprises implementing a logical AND operation to the one or more enable signals and the corresponding one or more control signals, respectively.

9. The method according to claim 1, wherein when there are two or more enable signals, implementing the logical calculus comprises: implementing a logical AND operation to the two or more enable signals and the corresponding two or more control signals respectively, to obtain two or more first results; and implementing a logical OR operation to the two or more first results to obtain the result of the logical calculus.

10. A mobile terminal, comprising:
a receiving circuitry adapted to receive signals; and
a determining circuitry adapted to: when the mobile terminal is currently working in a first communication mode, if the receiving circuitry receives a first signal of a second communication mode in a first frequency band, determine whether to continue working in the first communication mode or to shift to work in the first frequency band of the second communication mode based on a preset priority rank; further comprising:
 an enable signal generating circuitry adapted to generate one or more enable signals after the first signal is received, wherein each of the one or more enable signals indicates status of one communication mode in one frequency band, and one of the one or more enable signals indicates that status of the second communication mode in the first frequency band is valid;
 a control signal generating circuitry adapted to generate one or more control signals corresponding to the one or more enable signals, wherein the one or more control signals respectively indicate preset priority ranks between the first communication mode and one or more communication modes in one or more frequency bands corresponding to the one or more enable signals; and
 a logical calculating circuitry adapted to implement a logical calculus based on the one or more enable signals and the one or more control signals, to obtain an ultimate result based on which the determining circuitry is adapted to determine whether to continue working in the first communication mode or to shift to work in the first frequency band of the second communication mode.

11. The mobile terminal according to claim 10, wherein the first communication mode is a Wireless Local Area Network (WLAN) communication mode.

12. The mobile terminal according to claim 10, wherein the one or more communication modes comprise a Long Term Evolution (LTE) communication mode and a 2G/3G communication mode, the one or more enable signals comprise enable signals for indicating status of the LTE communication mode in multiple frequency bands and the 2G/3G communication mode in at least one frequency band, and correspondingly the one or more control signals comprise control signals for indicating preset priority ranks between the LTE communication mode in the multiple frequency bands and the first communication mode, and between the 2G/3G communication mode in the at least one frequency band and the first communication mode.

13. The mobile terminal according to claim 12, wherein the multiple frequency bands of the LTE communication mode comprise frequency band 38, frequency band 39, frequency band 40, and frequency band 41.

14. The mobile terminal according to claim 12, wherein the at least one frequency band of the 2G/3G communication mode comprises Digital Cellular System (DCS) frequency band of a Global System for Mobile Communication (GSM) communication mode, or frequency bands 34 and 39 of a Time Division-Synchronous Code Division Multiple Access (TD-SCDMA) communication mode.

15. The mobile terminal according to claim 10, wherein the one or more communication modes comprise a LTE communication mode, the one or more enable signals comprise enable signals for indicating status of the LTE communication mode in multiple frequency bands, and correspondingly the one or more control signals comprise control signals for indicating preset priority ranks between the LTE communication mode in the multiple frequency bands and the first communication mode.

16. The mobile terminal according to claim 10, wherein the one or more communication modes comprise a 2G/3G communication mode, the one or more enable signals comprise enable signals for indicating status of the 2G/3G communication mode in the at least one frequency band, and correspondingly the one or more control signals comprise control signals for indicating preset priority rank between the 2G/3G communication mode in the at least one frequency band and the first communication mode.

17. The mobile terminal according to claim 10, wherein the logical calculating circuitry is adapted to implement a logical AND operation to the one or more enable signals and the corresponding one or more control signals, respectively.

18. The mobile terminal according to claim 10, wherein when there are two or more enable signals, the logical calculating circuitry is adapted to: implement a logical AND operation to the two or more enable signals and the corresponding two or more control signals respectively, to obtain two or more first results; and implementing a logical OR operation to the two or more first results to obtain the ultimate result of the logical calculus.

* * * * *